(12) United States Patent
Hoskins et al.

(10) Patent No.: US 6,870,635 B1
(45) Date of Patent: Mar. 22, 2005

(54) SYSTEM AND METHOD FOR MANAGING PRINT OBJECTS USING STACKED OBJECTS QUEUE

(75) Inventors: Phillip Keith Hoskins, Berthoud, CO (US); Steven G. Ludwig, Broomfield, CO (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/572,029

(22) Filed: May 16, 2000

(51) Int. Cl.[7] ............................................. G06F 15/00
(52) U.S. Cl. ..................... 358/1.16; 358/1.15; 358/1.14
(58) Field of Search ............................. 358/1.16, 1.11, 358/1.2, 1.17, 1.18, 1.1, 1.14, 1.15

(56) References Cited

U.S. PATENT DOCUMENTS 5,113,494 A * 5/1992 Menendez et al. .......... 345/502
5,713,032 A   1/1998 Spencer
5,737,501 A * 4/1998 Tsunekawa ................. 358/1.2

* cited by examiner

*Primary Examiner*—Twyler Lamb
(74) *Attorney, Agent, or Firm*—Crawford Maunu PLLC

(57) ABSTRACT

A system, apparatus, method and program for controlling and tracking printable object headers associated with print objects being processed for printing in a printing system. The print object headers are provided in a plurality of queues, which are serially arranged in a stacked queue configuration. Print object headers are received at a first one of the queues, and as additional print object headers enter the stacked object queue via the first queue, they are controllably shifted through the remaining queues as they become available.

53 Claims, 12 Drawing Sheets

SYSTEM AND METHOD FOR MANAGING PRINT OBJECTS USING STACKED OBJECTS QUEUE

This application is related to the following co-pending and commonly-assigned patent applications, all of which are hereby incorporated herein by reference in their respective entireties:

"Method, System, and Logic For Selecting Line Work and Control Data For a Pixel From Multiple Objects Of Line Work Data Provided For The Pixel", to D. E. Finlay and P. K. Hoskins, having Ser. No. 09/570,211;

"Method, System, Program, and Data Structure For Generating Raster Objects", to J. M. Aschenbrenner, C. S. Kush, and J. T. Varga, having Ser. No. 09/569,777;

"Method, System, and Program For Error Checking Raster Objects," to J. M. Aschenbrenner, S. D. Hanna, P. K. Hoskins and S. G. Ludwig, having Ser. No. 09/499,722.

BACKGROUND OF THE INVENTION

1. Field of the Invention

This invention relates in general to printing systems, and more particularly to a system and method for managing print object headers associated with active print objects via a controllable stacked object queue arrangement.

2. Description of Related Art

To print an image, a print engine processor, also referred to herein as a raster image processor, converts the image in a page description language (PDL) or vector graphics format to a bit-mapped image indicating a value to print at each pixel of the image. The bit-mapped image is sent to the printer to cause the print heads to print the specified color value at the pixel according to the information in the bit map. If a printer has multiple print heads, such as a print head for different colors, then bit maps are generated for each print head. The print heads overlay the images defined by their respective bit maps onto the print medium.

To produce the bit maps for the print heads, the raster image processor performs numerous transformations on a print image, which may include different types of data, such as line art, e.g., text and graphics, and continuous tone (contone), e.g., images. The raster image processor may perform operations such as data compression, color space conversion, and halftoning when generating the raster bit map to print. After dissecting a print image into different components, such as color components, text art, contone, images, etc., the raster image processor merges the different elements together so that the original image, previously split into different components, is reconstructed for the color plane process.

Print data sent to such a print engine is typically formatted at the print engine hardware interface as either one continuous stream of data for each sheet printed, or in other cases may be formatted into multiple, individual, print objects for each sheet that is to be printed. In the latter case, x-axis and y-axis start locations along with other information about the object is sent with the object, so that the object can be printed in the correct location on the sheet. The information related to the print object is typically placed in a memory location by software, and the hardware fetches and retains the information.

When print objects are individually sent to the print engine for printing, the print process for these objects must be managed. Print manager hardware may retrieve the objects and associated information, such as object headers, from memory. The print manager holds the pertinent header information for various object parameters, such as start of object, end of object, overlapping, clipping, and the like. It also monitors the print process of each object, and determines when printing of the object is complete and can thereafter be discarded.

Performing a print management function could involve utilizing fixed queue locations that hold header information for each object being processed. Each queue location is filled with object header data on a "next available" basis. When a queue location becomes free, it could be directly filled with the next data for an object as it comes in. This has a variety of disadvantages, such as the accumulation of additional loads on the input data signals as more and more queue locations are added. This also exhibits the disadvantage of requiring more complicated chip routing, as each signal of the input data bus is wired from one source to the numerous queue locations.

It would be desirable to avoid the aforementioned and other printer problems, and thus a need exists in the printing industry for a system and manner of managing the queuing of print objects in an organized and efficient manner that, among other things, minimizes input load accumulation problems and facilitates on-chip signal routing. The present invention provides a solution to the aforementioned and other shortcomings of prior art printing systems, while offering additional advantages over the prior art.

SUMMARY OF THE INVENTION

To overcome limitations in the prior art described above, and to overcome other limitations that will become apparent upon reading and understanding the present specification, the present invention discloses a system, apparatus, method and program for controlling and tracking printable object headers in a printing system. Print object headers are associated with print objects that are being processed for printing. The print object headers are made available in a plurality of register sets or queues, which are serially arranged in a stacked queue configuration. As print object headers enter the stacked object queue via a first queue, they are shifted through the remaining queues as they become available.

In accordance with one embodiment of the invention, a print object management apparatus is provided for storing, organizing and managing print object header information as the corresponding print objects are concurrently pending for printing. The apparatus includes a plurality of serially-coupled header queues, essentially arranged in a stack of queues. Each of the header queues is configured to receive and store the print object header information associated with one of the concurrently pending print objects. A validity storage: module is provided to store validity indicators for each of the header queues, where the validity indicators indicate whether each respective header queue is storing valid print object header information. A print control processor causes the print object header information to be serially shifted to the header queues that are not associated with valid print object header information. In more particular embodiments, the print control processor also manages the shifting of the validity indicators through a series of valid-data registers as the print object header information is shifted through the serially-coupled header queues. Other more specific embodiments include the use of a prefetch queue to receive the print object header information for a subsequent print object, such that the print object header information is then shifted from the prefetch queue to an available header queue. One particular embodiment includes a print page prioritization module to associate a logical print page number to the print object header information in each of the serially-coupled header queues. This allows prioritization of the print order according to the logical print page number. The apparatus may be used in connection with a system for processing print objects associated with print jobs, where such a system includes a print processor for generating print objects having corresponding print object header information, an interface adapter to receive the print objects and corresponding print object header information from the print processor, and a memory coupled to the interface adapter to store the print objects and corresponding print object header information received via the interface adapter.

In accordance with another aspect of the invention, a method is provided for managing print object header information associated with print objects being processed for printing. Print objects headers are received at a designated print object queue associated with a plurality of serially-arranged or "stacked" print object queues. It is determined whether any of the remaining print object queues of the print object queue stack are currently occupied with valid print object header information. Received print object headers are shifted through the stacked print object queues to those print object queues that are not occupied with valid print object header information, which facilitates the receipt of additional print object headers at the designated print object queue. In this manner, print object header information is received at a dedicated queue, and shifted to the available queues in the stack of queues.

According to another embodiment of the invention, a computer-readable program storage medium that embodies a program of instructions executable by a computing system to manage print object header information is provided. The program of instructions allows print object headers to be received at a designated print object queue of a plurality of stacked print object queues. The program of instructions determines whether any of the remaining print object queues of the series of print object queues are currently occupied with valid print object header information. The received print object headers are shifted through the stacked print object queues to the print object queues that are not occupied with valid print object header information, in order to allow receipt of additional print object headers at the designated print object queue.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

The invention is described in connection with the embodiments illustrated in the following diagrams.

DETAILED DESCRIPTION OF THE INVENTION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

In the following description of the exemplary embodiment, reference is made to the accompanying drawings which form a part hereof, and in which is shown by way of illustration the specific embodiment in which the invention may be practiced. It is to be understood that other embodiments may be utilized, as structural and operational changes may be made without departing from the scope of the present invention.

Generally, the present invention provides for controlling and tracking printable object headers in a printing system. Print object headers are associated with print objects that are being processed for printing. Because multiple print objects may be processed concurrently, the corresponding object headers must be made available during processing of the corresponding print objects. The print object headers are made available in a plurality of register sets or queues, which are arranged in a stacked queue configuration. As print object headers enter the stacked object queue, they are shifted through the queues as they become available. Queue occupancy identifiers, sheet number identifiers, etc. assist in the shift control. In this manner, the input to the queue structure only bears one input load, which significantly reduces wiring complexities and allows for an organized flow of header information.

Figure 1:
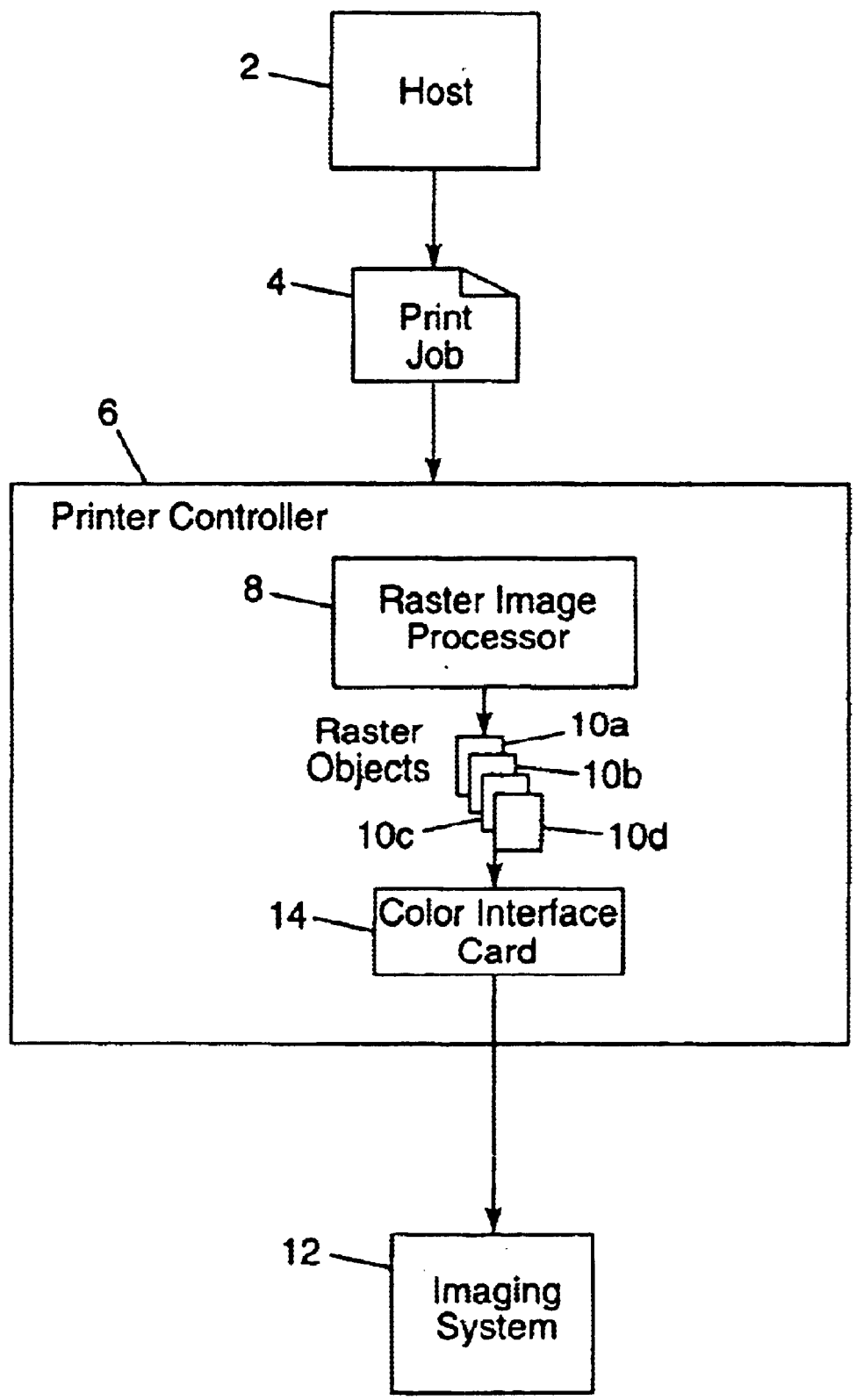
FIG. 1 illustrates a printing environment in which the principles of the present invention may be employed.

FIG. 1 illustrates a printing environment in which the principles of the present invention may be employed. A host computing system 2 generates a print job 4 that may include image (contone) and line work (text) components. The host 2 transmits the print job 4 to a printer controller 6 over a cable or other communication medium, or via a network transmission connection. The printer controller 6 may include a stand-alone processor or computer, such as the IBM RS/6000 processor. The printer controller 6 includes a raster image processor 8, that is preferably implemented in the RS/6000 main processor and accompanying firmware. In preferred embodiments, the raster image processor 8 generates raster objects 10a, b, c, d including the raster data. Each raster object 10a, b, c, d includes pixel information for one color component of the imaging system 12. For instance, if the imaging system 12 prints Cyan (C), Magenta (M), Yellow (Y) and black (K), there is one raster object for each color component for a scan line to print. Further, there may be separate raster objects 10a, b, c, d for line art and contone (images), thus providing 8 separate raster objects for each color component of a scan line for the line art and contone components of the line. The printer controller 6 and imaging system 12 components may be implemented in a common large scale printer, such as the International Business Machines (IBM) Corporation's Infoprint color printers, or with a separate server and stand-alone printer communicating over a network or attached directly using a serial or parallel port.

One embodiment includes a color interface card (CIC) 14 that is preferably, implemented on a hardware card, such as a peripheral component interconnect (PCI) card using Field Programmable Gate Array (FPGA) logic. The CIC 14 may be inserted in a PCI slot of the backplane of the printer controller 6. The CIC 14 performs further processing of the raster objects 10a, b, c, d before they are sent to the imaging system 12 for printing.

In certain implementations, one CIC 14 can produce print data for two of the color planes. In such case, two CICs are used to generate the final raster for the output device for all four color planes. In duplex implementations where the printer prints on both sides of a sheet concurrently, four CICs are used, two for each side of the sheet to concurrently generate raster data for the print heads printing to both sides.

Once contone and line work raster objects 10a, b, c, d are generated, the CIC 14 combines information and produces the final print output. The raster image processor 8 encodes the line work and contone objects with header information that enables the CIC 14 logic to combine multiple line work and contone objects per scan line into final print output. In this way, many of the raster processing operations can be off-loaded to a separate hardware card (e.g., the CIC 14), thereby relieving the raster image processor 8 of many of the processor-intensive raster operations. This in turn substantially increases the ultimate printer speed and performance, as the final raster output data used by the printer (or other output device) is generated faster by offloading many of the raster processing operations to dedicated hardware logic implemented in the CIC 14.

In described implementations, the raster image processor 8 is capable of generating four line work (LW) and four contone (CT) objects per scan line per color plane, i.e., a total of 32 objects. The number of line work and contone objects per scan line is dependent on the capabilities of the CIC. In described implementations, the CIC 14 includes hardware logic to handle up to four line work and four contone objects per scan line per color, totaling 16 line work and 16 contone objects per scan line. For this reason, if the raster image processor 8 receives input print data objects including more than four contone or line work objects per scan line, then the raster image processor 8 must merge certain objects to conform to the CIC 14 hardware, limitations. If the CIC 14 was capable of handling more or less line work or contone objects per scan line, i.e., n objects, then the raster image processor 8 would have to merge input print data objects to ensure that there are no more than n line work or n contone objects per scan line.

The raster image processor 8 will generate contone objects that provide eight bits per pel for contone (CT) color data and line work objects that provide eight bits per pel for the line work (LW) color data. The raster image processor 8 further generates two line work control (LWC) bits for each pixel in the line work object. The line work control (LWC) bits can be encoded with one of three values, select line work (LW), select contone (CT) or transparent. Select line work (LW) instructs the CIC 14 to use the pixel data in the line work object over data for the pixel in any other line work object or contone object. Select contone (CT) instructs the CIC 14 to use the pixel data in the highest priority contone (CT) object over data for the pixel in any line work (LW) object, and transparent instructs the CIC 14 to consider the line work control (LWC) bits in the next highest priority line work control object, i.e., the pixel is transparent and the next lower order line work data should be considered to determine whether it is non-transparent and used.

The raster image processor 8 will further generate header data for each line work and contone object for use by the CIC 14. The following are representative fields encoded in the line work and contone headers for each object in accordance with one embodiment of the invention.

Sequence Number: The raster objects for each color may then be numbered consecutively starting from zero for the raster (proxy) object at the top of the sheet having the lowest priority to the last raster object on the sheet having the highest priority. This new number is the sequence number. The sequence number is reset to zero for each color for the first object on the next sheet. Thus, raster objects are to be printed on a sheet according to the ordering of their sequence numbers.

Object Type: Indicates whether an object is the first raster object on a sheet, a last object or a next object, which is any object between the first and last raster object. The object type also indicates whether the object is the last raster object for the entire print job, and whether a blank page is to be printed. In preferred embodiments, the object type is represented by a five bit code, where the first bit indicates that the raster object is the first object on the sheet; the second bit indicates that the raster object is a next object, i.e., following the first object on the sheet; the third bit indicates that the raster object is the last object on a sheet; the fourth bit indicates whether the raster object is the last raster object for the print job; and the fifth bit indicates to print the entire current sheet blank, such as if one of the colors will not appear on the sheet or there are no line work or contone objects for the sheet.

Compression type: information on the compression algorithm used to compress the raster object.

Priority level: indicates the priority for objects overlapping the same scan line. Objects with a higher priority are printed preferentially in place of other objects on a per pel basis. Thus, objects for a pel of a higher priority will appear over objects for a pel of a lower priority unless the high priority object is transparent to allow the lower priority object for the pel to appear through the higher priority object. Thus, the priority level indicates the order in which objects overlapping on a scan line are overlaid. The priority numbers are chosen to correspond to priorities of the four objects that overlap the same set of one or more scan lines.

Start and Stop Transport Addresses: Indicates the first and last coordinates the raster object occupies on the sheet in the transport direction.

Start and Stop Scan Addresses: Indicates the first and last coordinates the raster object occupies on the sheet in the scan direction.

Start and Stop Clip in Transport Direction: Indicates the start and stop in the transport direction of where to clip the image. For instance, if the start transport address is less than the start clip address, then the image will be clipped, not printed, for those pixels prior to the start clip address. If the end transport address is greater than the end clip transport address, then the image will also be clipped.

Start and Stop Clip in Scan Direction: Indicates the start and stop in the scan direction of where to clip image.

Link Address: A pointer to the line work or contone data represented by the header. The link address for line work header would specify both the address of the line work data (eight bits) and the line work control (LWC) bits.

After generating header objects for each contone and raster object, the raster image processor 8 generates one contone and one line work linked list of pointers to the headers according to the sequence number of the corresponding raster object. The raster image processor 8 then hardens in memory the proxy objects as raster objects and the header objects therefor so that the raster object and header addresses will not be overwritten or altered in memory by the operating system before they are accessed and then released by the CIC 14. In this way, all the raster object data is maintained in a high speed memory which provides fast access for the CIC 14 when requesting the data to process. This memory arrangement further improves performance by allowing the CIC 14 to immediately retrieve raster and header objects from a high speed memory.

Figure 2:
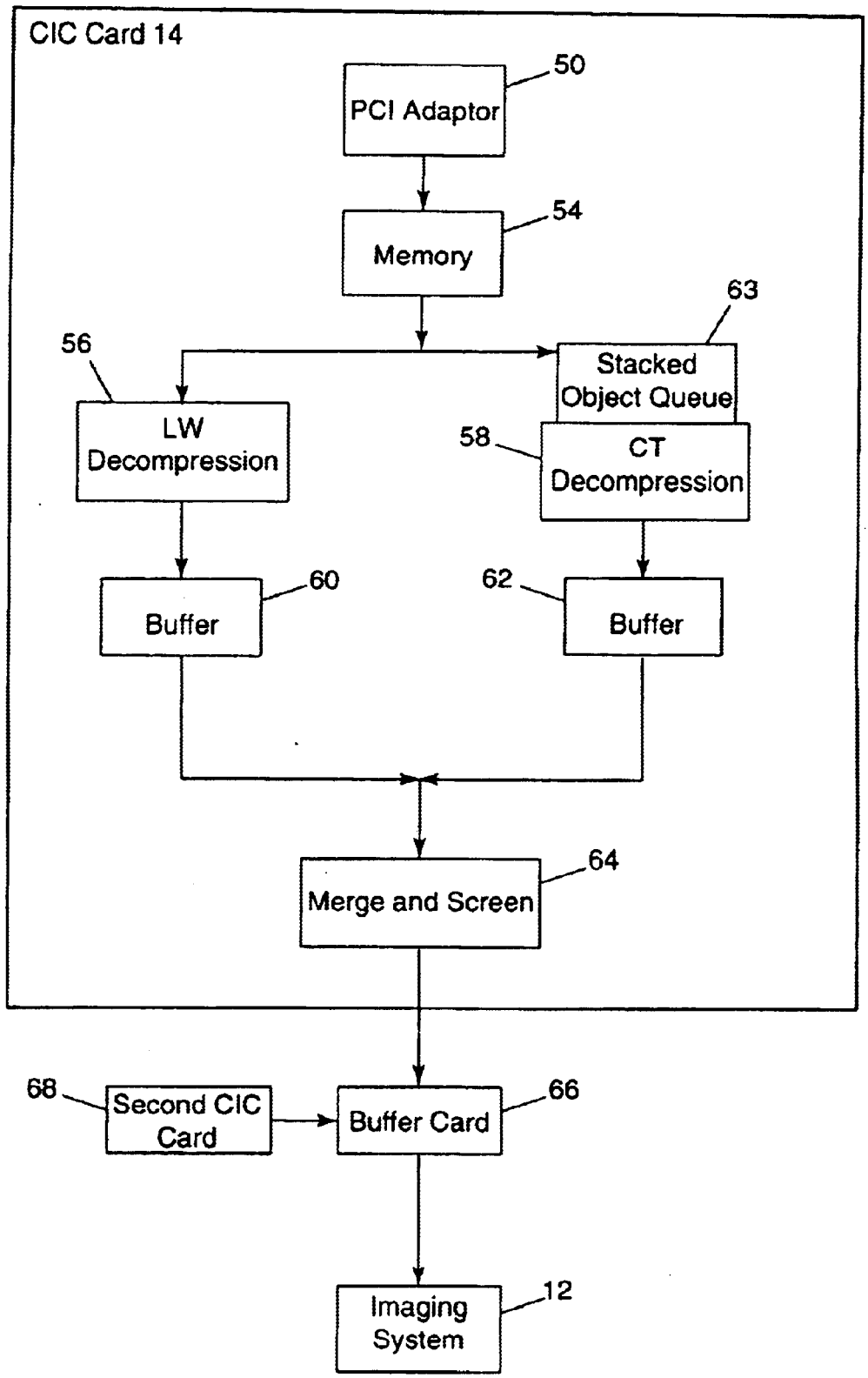
FIG. 2 illustrates an exemplary implemented architecture for processing raster data in which the principles of the present invention may be employed.

The CIC 14 hardware retrieves the generated raster objects 10a, b, c, d, i.e., line work and contone objects, from the raster image processor 8 memory to generate final raster output for the imaging system 12. FIG. 2 illustrates one embodiment of a CIC 14 architecture. A PCI adaptor 50 includes logic to retrieve line work and contone objects from the raster image processor 8. Memory 54 buffers and stores the retrieved line work and contone objects and their headers. The memory 54 may comprise one or more memory cards for storing the header data, line work (LW) objects, contone (CT) objects, and line work control (LWC) objects. The line work (LW) decompression 56 logic decompresses line work and line work control (LWC) objects and the contone (CT) 58 decompression logic decompress contone objects. The decompressor logic 56 and 58 writes the decompressed data into buffers 60 and 62, respectively.

In accordance with the present invention, a stacked object queue arrangement 63 is provided at the input of the CT decompression logic 58 to receive and store multiple print objects. While both print data and print object header data are stored in the memory 54, the present invention, and therefore the stacked object queue 63, is directed to management of the object header data. Further, while one embodiment of the present invention utilizes the stacked object queue 63 only in connection with the contone (CT) objects, the invention is equally applicable to line work (LW) objects and thus could also be used at the input of the LW decompression logic 56. The stacked object queue logic 63 is described in greater detail below.

The merge and screen logic 64 accesses a byte of contone data from the contone (CT) buffer 62 and a byte of line work data from the line work buffer 60. Based on the value of the line work control (LWC) bits, i.e., line work select or contone select, the merge component of the logic 64 would merge the data into a single byte of data, from either the line work or contone data, and pass to the screening algorithm. Depending on the type of data, i.e., contone or line work, the screening logic would screen the data to provide the proper color intensity, and then write the data to the buffer card 66, which also receives pel data for two other color planes from a second CIC 68. As discussed, in certain implementations, each CIC 14 handles two color planes, thus requiring two cards for all four CMYK color planes.

Within the stacked object queue logic 63 on the CIC 14, there are multiple queues that assist in the management of printing print objects. A print manager retrieves the print objects and associated headers from memory, holds the pertinent header information, monitors the print process of each print object, and determines when printing of the object is complete and can be discarded. Each of the multiple queues is a set of registers each identified with a printable object. Because multiple queues for the various print objects are employed, routing of these print objects to the various queues can result in chip routing complexities, particularly where a large number of bits are used to transmit the print objects. In one example, print objects are transmitted via 32 bits, and the input-to-queue wiring of multiple 32-bit paths between the print object input and each of the multiple queues can result in significant wiring complexities, can occupy a considerable amount of cell space, and can present increasing loads on the input data signals as more queue locations are required. The present invention addresses this and other problems, and is particularly useful in connection with technologies where cells are constrained or wiring is difficult.

The present invention utilizes a stacked object queue for print object header data, where the next available header data is brought to the top queue location, and shifted into lower queue locations. This provides many advantages and benefits, one of which is that the input data signals are only loaded with one load, regardless of how many queue locations are used. Further, this provides a simplified wiring flow from one queue register to the next. FPGAs, programmable logic devices (PLDs), and the like, which have limited routing resources, greatly benefit from such a simplified wiring flow. In some instances, FPGAs, PLDs, and the like may be implemented where they were otherwise considered "full" or were too limited in routing resources to be used in connection with the routing of these queues. In accordance with the invention, control logic for the stacked object queue keeps track of objects, and data for objects, as they are shifted through the stacked queuing structure. For example, when an object completes and is purged from its queue location, the queue arrangement is shifted from above towards the lower, empty queue locations to make room in the top queue for the next object to be printed. An object does not necessarily spend its entire time in the same queue location while being printed, and the present invention provides the control functionality to monitor and control this and other activities.

Figure 3:
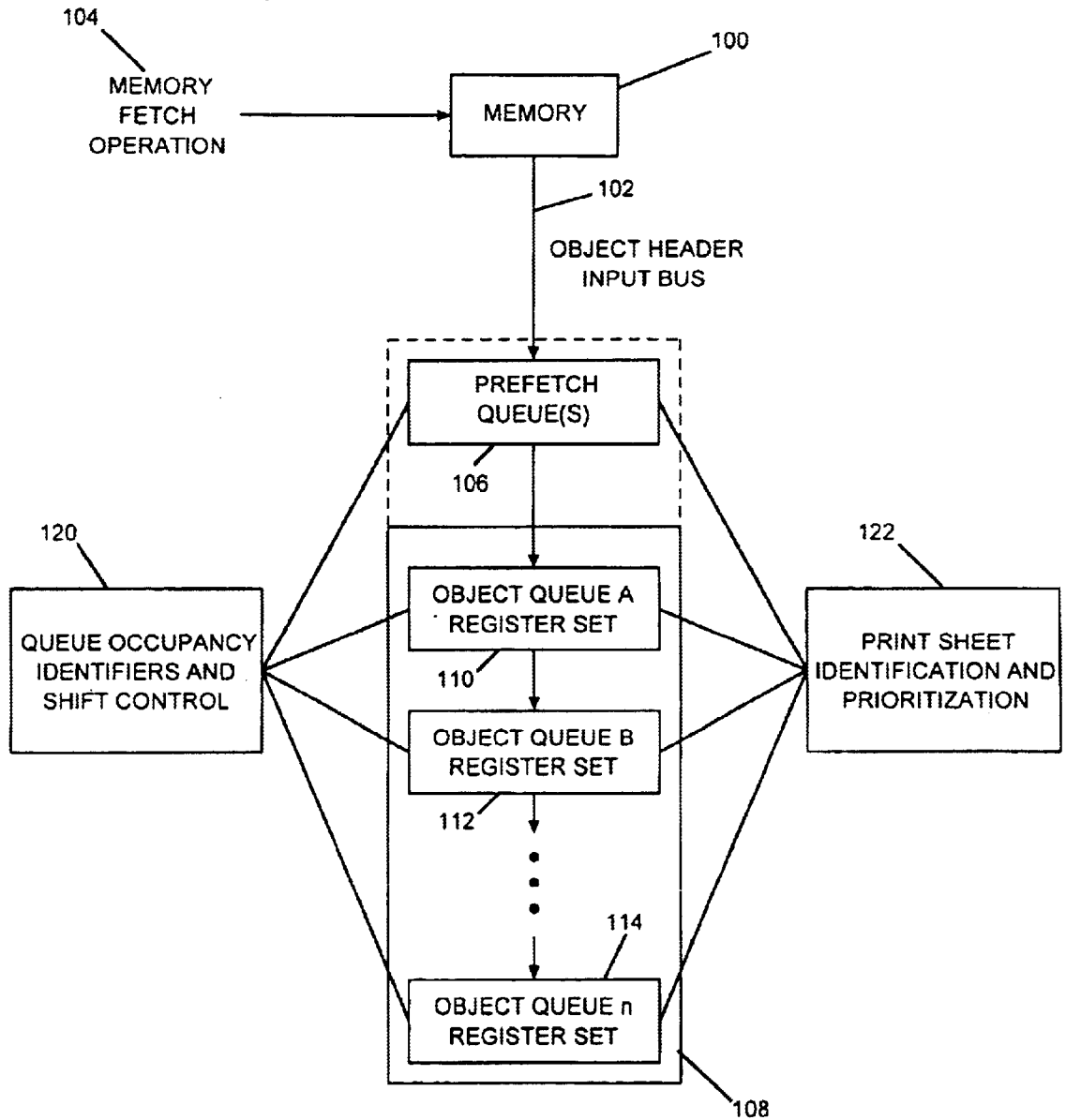
FIG. 3 is a block diagram illustrating a stacked object queue arrangement in accordance with the present invention.

Referring now to FIG. 3, a block diagram is provided illustrating a stacked object queue arrangement in accordance with the present invention. Print object headers are stored in a memory 100, which provides the object header data associated with a print job via the object header input bus 102 in response to a memory fetch operation 104. The input bus 102 is a 32-bit wide bus that transmits the header data associated with print objects. Print objects include two parts, including a header, and the data that is to be printed.

The bus 102 transmits the header portion of the print objects to a first queue, labeled the prefetch queue(s) 106. The data that is actually to be printed is managed through another path independent from the stacked object queue arrangement described herein.

The prefetch queue 106 holds the header information for a print object. As described above, the header includes various print control parameters, including sequence number, object type, compression type, priority level, start and stop transport addresses, start and stop scan addresses, start and stop clip in transport direction, start and stop clip in scan direction, and link address. As described more fully below, print objects are shifted through the various queues of the stacked object queue arrangement, beginning with the prefetch queue 106. The prefetch queue 106 acts as an "on deck" queue because it is used to fetch the next object while the objects in the other queue locations are being processed and printed. The "on deck" or prefetch queue thus allows for fetch ahead of one object while the other queue locations are being processed.

A plurality of object queues are provided in addition to the prefetch queue 106. The plurality of object queues is illustrated in FIG. 3 as the stacked queue structure 108. Generally, the prefetch queue forms part of the stacked queue structure 108 as well. The multiple queues in the illustrated embodiment of FIG. 3 includes the object queue A register set 110, object queue B register set 112, through a desired number of object queue register sets depicted by object queue n register set 114. There can be any desired number of queue locations 110, 112, 114, depending on the needs of the architecture and the capacity of the hardware technology. For example, where the architecture has a limit of four print objects per print scan line that can "interact," then four object queues are provided. To "interact" includes print functions such as overlapping, clipping, and the like.

Each of the object queue register sets (110 through 114) hold header information for a print object. Each queue location contains several registers that hold the header file information about the print object. For example, each register within a particular object queue register set may be used to hold a different particular item of the header information, such as the start scan address, the stop scan address, priority level, etc. In one embodiment of the invention, the registers associated with each of the object queues 110, 112, 114 is arranged in a stacked shift register architecture.

The stacked queue structure 108 may be empty, i.e., not occupied with print object header information. Generally, this occurs upon start up of the printing system, reset of the printing system, and when a print job has completed processing. When a new print job arrives via the object header input bus 102 and is held in the prefetch queue 106, the print object header data will be shifted through the stacked queue structure 108 by way of queues 110, 112, 114. In this manner, the print object header data can be held in multiple queues without the problems associated with having the input bus directly feed all multiple queues in the system.

In order to commence print object processing, a memory fetch is performed to bring print object header information into the prefetch queue 106. From the prefetch queue 106, the object data is shifted through the object queues 110, 112, 114. As print objects are processed and completed, the queue locations 110, 112, 114 that are complete become "empty," thus allowing the data to shift down to fill the void resulting from the completed print object processing. Thus, in the stacked object queue arrangement of the invention, the next available data is brought into the top queue location (i.e., the prefetch queue 106), and shifted into lower unoccupied queue locations.

An object can be long-lived, i.e., it can be relatively large and may stay in the stacked queue structure 108 for a long time. The present invention allows such an object to be moved through the stacked queue structure 108 while the associated object it is being printed. For example, a large object being printed can first be in object queue A 110, and can be shifted to object queue B 112 through object queue n 114 during the printing process. Each print object is assigned a logical object number that remains constant throughout printing of that print object, regardless of which of the one or more object queues that print object is associated with. Objects are thus identified and distinguished by this logical object number. In this manner, objects can be tracked regardless of which of the queues it is associated with.

Other control features assist in properly tracking the print objects as they are shifted through the stacked object queue 108. Block 120 represents the queue occupancy identifiers and shift control functionality, and block 122 represents the print sheet identification and prioritization. Generally, the queue occupancy identifiers and shift control 120 tracks queue locations that are currently occupied with data. Tracking whether each queue currently holds valid data is used to determine if the stacked queue needs to shift down to an unoccupied (also referred to as "invalid" or "empty") queue location. Shift control features are provided at block 120 as well, to account for timing considerations that arise during the actual shifting process. This is described in greater detail below.

The print sheet identification and prioritization module 122 provides a manner of associating a logical sheet/page number to each queue location to indicate which logical sheet number the particular object is associated with. Generally, the logical sheet number is used during print processing to allow the logic to determine whether a particular queue contains an object that is on the currently active sheet and thus needs to be processed. A current or "active" logical sheet number register is also provided to assist in the determination of whether a particular queue contains an object that currently needs to be processed. The functionality of the print sheet identification and prioritization 122 is described in further detail below.

Figure 4:
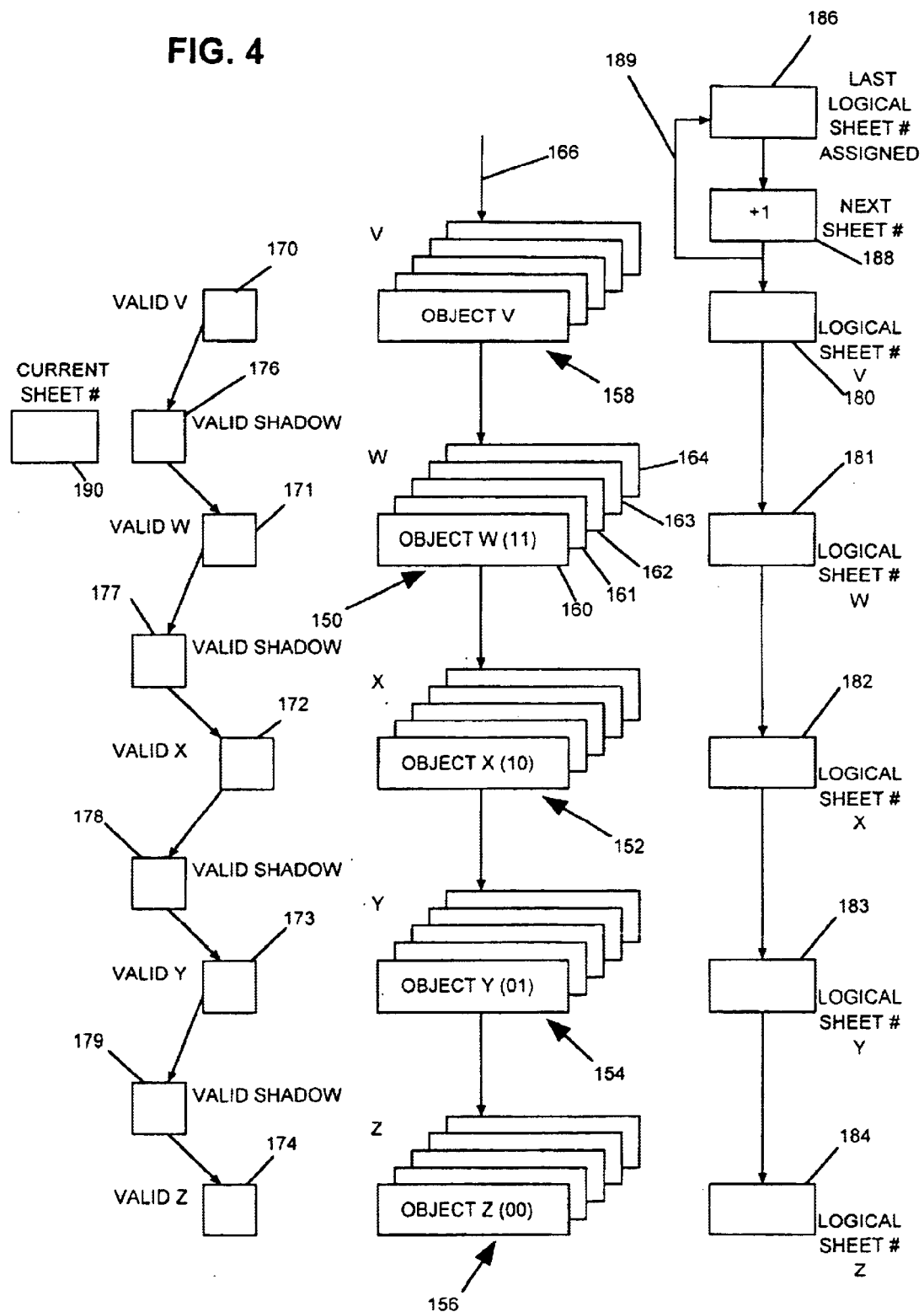
FIG. 4 is a block diagram of a more particular embodiment of a stacked object queue arrangement in accordance with the present invention.

FIG. 4 is a block diagram of a particular embodiment of a stacked object queue arrangement in accordance with the present invention. In this particular embodiment, four queue locations 150, 152, 154, 156 are provided, along with one prefetch queue 158. The prefetch queue 158 and the remaining object queues 150, 152, 154, 156 are arranged in a serially-coupled chain, or "stacked" queue arrangement. In this example, the use of four queue locations indicates that the architecture has a limit of four print objects per print scan line that can interact, e.g., overlap, clip, etc.

Each of the queues 150, 152, 154, 156, 158 represents a set of registers. For example, queue W 150, associated with print object header W, includes a plurality of registers 160, 161, 162, 163, 164. The number of registers depends on the quantity and/or number of parameters associated with the print object header information. Each of the other object queues X 152, Y 154, Z 156, and V 158 similarly includes a plurality of such registers for storing the print object header information.

The prefetch queue V 158 receives the header for an object via the input path 166. In one embodiment, the input path 166 is a 32-bit wide bus for transmitting the header information. Upon start up of the printing system, all of the queues 150–158 are empty. A queue is deemed "empty" when it is hot associated with valid header information, such as upon initialization or reset, or when print processing of a print object associated with that queue is complete. When any of the queues 150–158 are empty, a memory fetch is performed for a print object. When the print object header information is fetched and stored in the prefetch queue V 158, the shifting process may begin.

In the illustrated embodiment, objects processed for printing, where four objects occur on a scan line, will be shifted into queue locations W 150, X, 152, Y, 154 and Z 156. The number of queue locations corresponds to at least the number of objects allowed to interact on a print scan line, because the object manager must be able to access information, e.g., overlap, from all objects on the print scan line at the same time. In the illustrated embodiment, the number of queue locations is greater than the number of objects allowed to interact on a print scan line, due to the inclusion of queue V 158, which serves as an "on deck queue" because it is used to fetch the next object while the objects in the other queue locations are being processed and printed. Thus, the queue V 158 allows for fetch ahead of one object while the other queue locations are being processed. While the illustrated embodiment provides for one such prefetch queue V 158, it is conceivable that additional prefetch queues could be implemented.

As objects in the queue locations 150, 152, 154, 156 complete processing, the respective queue will be deemed "empty" or "unoccupied." More particularly, any residual header information in the queues upon completion of processing will be deemed invalid, thereby allowing the queue to accept new print object header information. For example, when an object is canceled, the data is still present in the queue, but it must be "invalidated" so that no further processing of the information in that queue occurs. The process of shifting objects through the queues is controlled in order to keep the stacked object queue arrangement full, and in order to accommodate timing considerations during the shifting process.

Each queue 150–158 is associated with a queue occupancy identifier that indicates whether valid header information is currently being processed in connection with that queue. These identifiers for queues V 158, W 150, X 152, Y 154 and Z 156 are illustrated as the valid V 170, valid W 171, valid X 172, valid Y 173 and valid Z 174 registers respectively. An asserted state in one of the valid registers 170, 171, 172, 173, 174 indicates that there is valid data in the respective queue. The valid data is used in various aspects of the printing process logic, and is also used to determine whether the stacked object queue needs to shift down to an invalid/empty queue location. Therefore, when a valid register 170, 171, 172, 173, 174 indicates that it's respective queue 158, 150, 152, 154, 156 has no valid data associated therewith, the queues can be shifted down to fill the vacancy.

Also associated with each of the queue locations is a "valid shadow" register, illustrated as valid shadow registers 176, 177, 178, 179; The valid shadow register is used to store the valid bit(s) for a queue location while the stacked queue arrangement is shifting. This is necessary as many conditions are determined by the data in each queue location, and various state, machines are started, or react to, data in each queue location. As the queue is shifting, the valid registers must be effectively inactivated or "turned off" so that other logic is not affected by the data that is shifted through each queue location. If the valid registers are left activated during the shifting process and the valid identifiers associated therewith were moved to the appropriate queue location after the shifting process, an object could appear as ready to print, that is was completed, or could otherwise start the logic to handle such a case. This can provide unpredictable results.

The use of the valid shadow registers in accordance with the present invention allows the objects to be shifted, while properly managing the timing considerations and avoiding such unpredictable results. During a shift through the object queues, the valid registers 170, 171, 172 and 173 are effectively inactivated, and the contents of each of the valid registers 170, 171, 172 and 173 is respectively stored in valid shadow registers 176, 177, 178 and 179. In one embodiment, this "inactivation" occurs as a result of moving the contents of the valid registers into the corresponding valid shadow registers. Because the valid registers are inactivated during the shift, none of the logic will attempt to operate on the queue information during the shift. When the shift is complete, the contents of the valid shadow registers 176, 177, 178 and 179 is shifted downward to valid registers 171, 172, 173 and 174 respectively and activated. Thus, the valid identifier for a particular queue is shifted with its respective queue, but managed in an organized manner. Because queue Z 156 is the bottom of the stacked queue arrangement, the valid Z register 174 does not require the use of a valid shadow register. One alternative to the use of valid shadow registers is the use of a lock-out flag for each valid register.

Each queue location also has a logical sheet number associated with it, which is stored in an associated sheet number register. For instance, queue V 158 is associated with logical sheet number register V 180, queue W 150 is associated with logical sheet number register W 181, queue X 152 is associated with logical sheet number register X 182, queue Y 154 is associated with logical sheet number register Y 183, and queue Z 156 is associated with logical sheet number register Z 184. Each queue location can be associated with objects on different pages in the resulting printout. The logical sheet number indicates what logical sheet number is associated with the print object in its respective queue 158, 150, 152, 154, 156, and is a number assigned to the object. One or more bits in the header indicate whether the object is the first object on the sheet, the last object on the sheet, or the next object on the sheet. Upon initialization (or reinitialization) the last logical sheet number assigned is set to zero in the "last logical sheet # assigned" register 186. Each print object, and thus queue location, is assigned the last sheet number unless the information in the header indicates the print object is "first on sheet." If a print object is identified as one that is "first on sheet," it is assigned the last logical sheet number from the last logical sheet # assigned register 186, plus one as indicated at the increment block 188. The last sheet number is also incremented, as indicated by feedback path 189. The logical sheet number is used during print processing to allow the logic to determine whether a particular queue contains an object that is on the currently active sheet and needs to be processed. The currently active sheet is stored in the current sheet number register 190, and is incremented when the last object on a sheet, as indicated in the header information, is completed.

Using the logical sheet number and the current sheet number, only the objects that are on the current sheet are operated on by identifying objects on the current sheet number as valid objects to process. Another advantage to the use of the logical sheet numbers is that it allows additional prefetching of objects. For example, if there is only one object on a sheet, and it is a large object, this object can be shifted to the lowest queue (i.e., queue Z 156), and all of the higher queues 158, 150, 152 and 154 can be used to fetch up to four more objects ahead of the currently-processed object.

The print object management function needs to determine whether an object in the queue is active on a particular scanline when the currently active sheet is being processed for printing. This is how an object(s) is selected for data transfer to the print head logic. During printing, hardware print controllers utilize a register, such as a T_ADDRESS register, that indicates where on the printed sheet in the paper transport direction the print mechanism is currently processing. It is then determined if an object is active on a particular scanline by checking all queue locations (except for the prefetch queue) for a certain condition. More particularly, the print object management function checks to see if the paper transport direction address or location, T_ADDRESS, is greater than or equal to the object transport direction start address (TDSA). The print object management function further determines whether the T_ADDRESS is less than or equal to a value TDPCA, which is the object transport direction stop clip address or last scanline of the object to be printed. The TDSA and TDPCA are located in the header information in each queue. If these two conditions are true, and the object is valid and on the current sheet, it is a candidate for data transfer to the print engine.

The print object management function also determines whether an object has completed its data transfer to the print engine. This is accomplished by determining for each queue location whether the T_ADDRESS is greater than the TDPCA. If so, the print mechanism has passed the location on the sheet where the object is being printed, and therefore the object has completed. When this occurs, the valid bit(s) is turned off for the queue in which this object is located, thereby allowing further queue shifting to fill the newly-presented vacancy.

Figure 5:
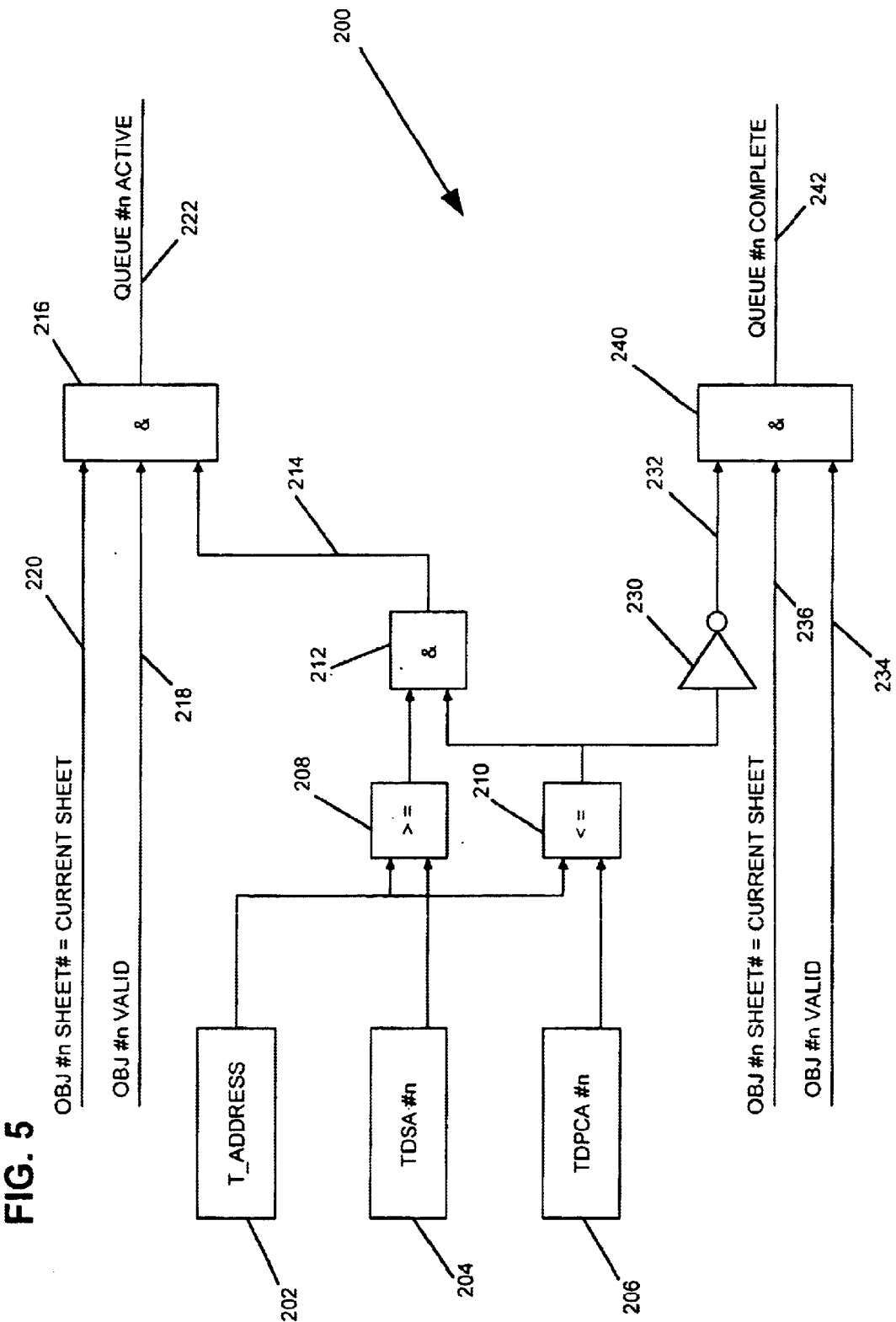
FIG. 5 is a block diagram illustrating an active/complete determination logic module in accordance with one embodiment of the invention.

FIG. 5 is a block diagram illustrating an active/complete determination logic module 200 in accordance with one embodiment of the invention. To determine whether an object in the queue is active on a particular scanline when the currently active sheet is being processed for printing, the previously-described registers T_ADDRESS 202, TDSA #n 204 and TDPCA #n 206 are provided. The contents of the T_ADDRESS register 202 is compared to the contents of the TDSA #n for queue #n at comparator 208 to determine whether the paper transport direction address is greater than or equal to the object transport direction start address at queue #n. The contents of the T_ADDRESS register 202 is further compared to the contents of the TDPCA #n for queue #n at comparator 210 to determine whether the paper transport direction address is less than or equal to the object transport direction stop clip address or last scanline of the object to be printed. If both of these conditions are met as determined at the "AND" operation block 212, a true signal is provided on line 214 to AND operation block 216. If a true signal is provided on line 214, and the object is valid according to queue #n's valid register as indicated via line 218, and the object is on the current sheet as indicated via line 220, the AND operation block 216 will provide a true output signal 222 indicating that queue #n is "active" and is a candidate for data transfer to the print engine. Each of the n queues are similarly analyzed.

To determine whether an object has completed its data transfer to the print engine, the previously-described registers T_ADDRESS 202 and TDPCA #n 206 are used. If, for each queue location, the contents of the T_ADDRESS register 202 is greater than the contents of the TDPCA #n register 206, the print mechanism has passed the location on the sheet where the object is being printed, and the object has therefore completed. In one embodiment, it is determined whether the contents of the T_ADDRESS register 202 is greater than the contents of the TDPCA #n register 206 by first determining at comparator 210 whether the paper transport direction address is less than or equal to the object transport direction stop clip address or last scanline of the object to be printed, and inverting this result at inverter 230 to indicate whether the contents of the T_ADDRESS register 202 is greater than the contents of the TDPCA #n register 206. If a true signal is provided at the output of inverter 230 on line 232, and the object is valid according to queue #n's valid register as indicated via line 234, and the object is on the current sheet as indicated via line 236, the AND operation block 240 will provide a true output signal 242 indicating that queue #n is "complete." In this case, the valid bit is turned off for queue #n where this object was located. Each of the n queues are similarly analyzed.

Figure 6:
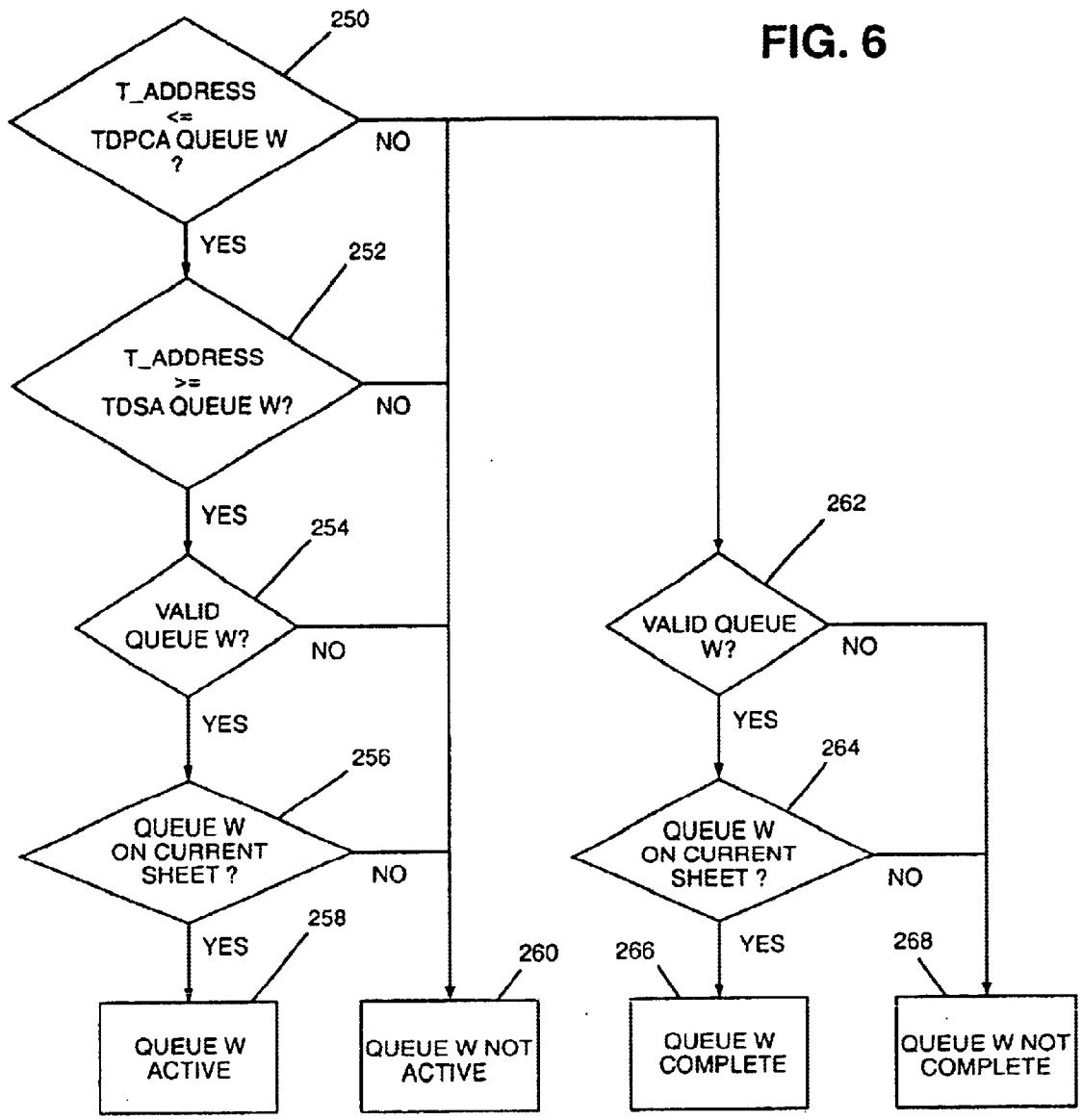
FIG. 6 is a flow diagram illustrating an active/complete determination method in accordance with one embodiment of the invention.

FIG. 6 is a flow diagram illustrating an active/complete determination method in accordance with one embodiment of the invention. The example of FIG. 6 is provided for a particular one of the plurality of queues in the stacked object queue arrangement, and for purposes of illustration is directed to queue W 150 shown in FIG. 4. Those skilled in the art will recognize that the process described in connection with FIG. 6 is equally applicable to other queues in the stacked object queue arrangement.

To determine whether a queue is active, it is determined at decision operation 250 whether the contents of the T_ADDRESS register is less than or equal to the contents of the TDPCA for queue W. If so, it is determined 252 whether the contents of the T_ADDRESS register is greater than or equal to the contents of the TDSA for queue W. If so, it is determined 254 whether queue W is identified as valid, and if valid, whether the object in queue W is on the current sheet as determined at decision operation 256. If all of these conditions 250, 252, 254, 256 are true, queue w is active as illustrated at block 258. Otherwise, if any of these conditions 250, 252, 254, 256 fail, queue W is not active as illustrated at block 260.

To determine whether processing of an object associated with queue W is complete, it is determined at decision operation 250 whether the contents of the T_ADDRESS register is less than or equal to the contents of the TDPCA for queue W. If not, this indicates that the contents of the T_ADDRESS register is greater than the contents of the TDPCA for queue W. In this case, it is further determined 262 whether queue W is identified as valid, and if valid, whether the object in queue W is on the current sheet as determined at decision operation 264. If condition 250 is not true, and conditions 262, 264 are true, queue w is complete as illustrated at block 266. Otherwise, queue W is not complete as illustrated at block 268.

The block diagrams of FIGS. 3 and 4 illustrate embodiments of stacked object queue arrangements in accordance with the present invention. Various methodologies may be implemented to carry out the required functions that control the stacked object queue shifting. The following flow diagrams illustrate various embodiments of methodologies used to carry out such functions.

Figure 7:
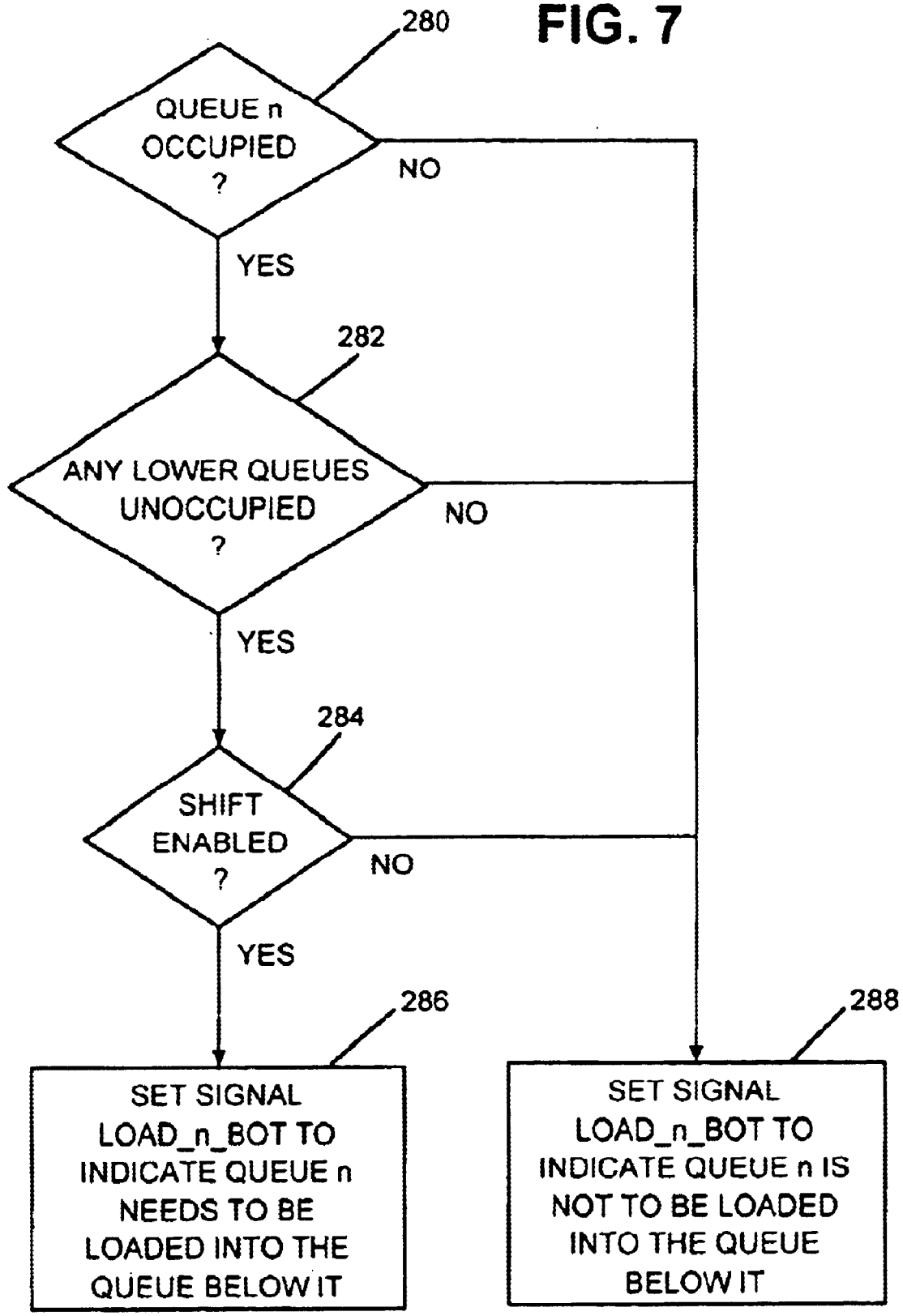
FIG. 7 is a flow diagram illustrating an embodiment of a method for indicating whether a queue is in a position to be shifted into a lower queue.

Referring now to FIG. 7, a flow diagram is provided to illustrate one embodiment of a method for indicating whether a queue is in a position to be shifted into a lower queue. Generally, a queue is in position to be shifted where the queue is designated as valid, and at least one queue below it is designated as not valid. More particularly, it is determined 280 whether the particular queue, queue n, is occupied (i.e., designed as "valid"). If so, it is determined 282 whether any of the lower queues in the stacked object queue arrangement are unoccupied (i.e., not designated as "valid"). If any of the lower queues are not designated as valid, and shifting is enabled as determined at decision operation 284, a signal (e.g., LOAD_n_BOT) is set 286 to indicate that queue n needs to be loaded into the next queue location (i.e., the queue logically below it in the stacked object queue arrangement). Otherwise, if any of the conditions 280, 282, 284 are not met, the signal is set 288 to indicate that queue n is not to be loaded into the next queue location. The state of this signal, e.g., LOAD_n_BOT, is subsequently used to determine whether a queue location should actually shift. This is described more fully below.

Figure 8:
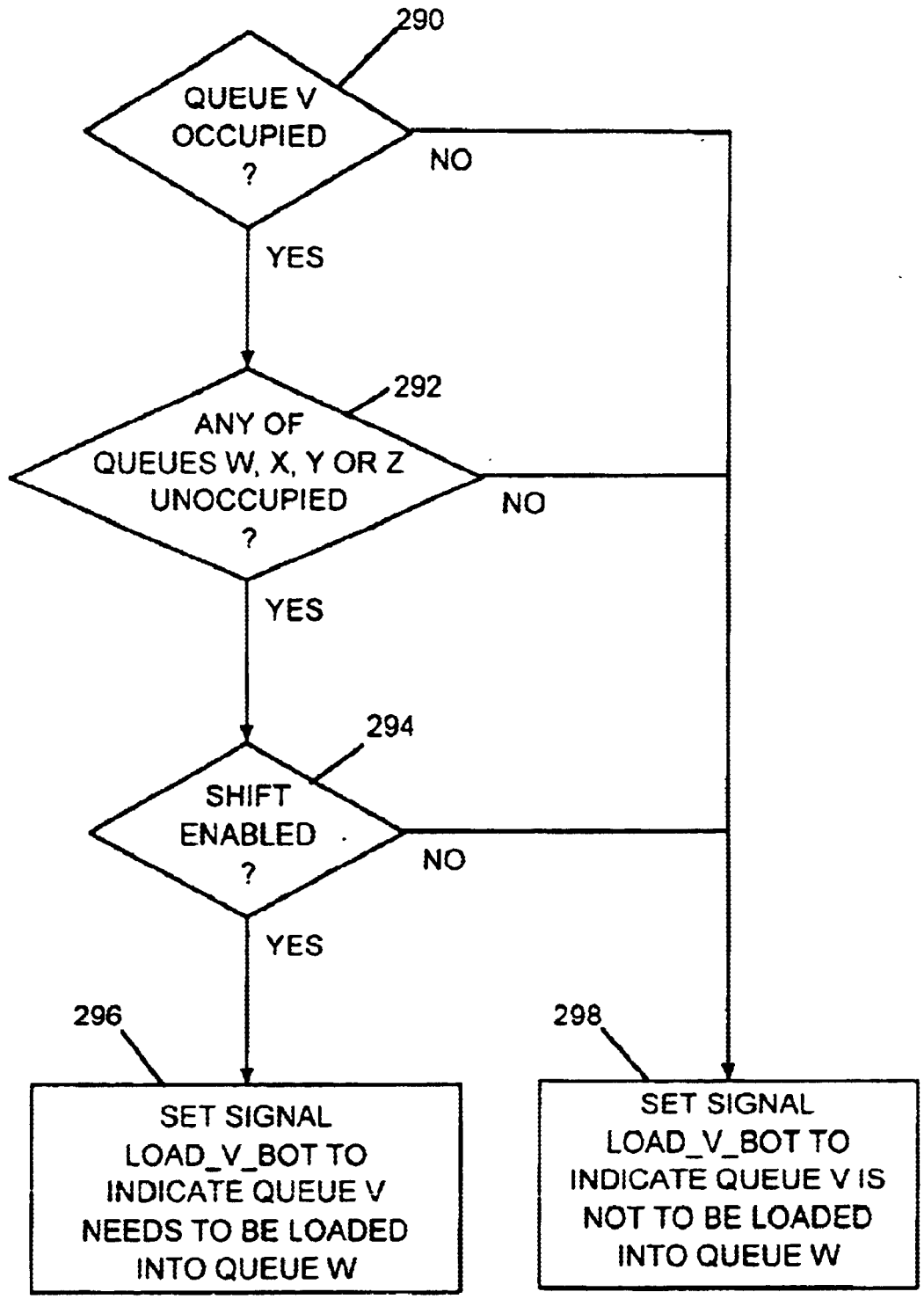
FIG. 8 provides a more specific example embodiment of a method for indicating whether a particular queue in the stacked queue arrangement is in a position to be shifted into a lower queue.

FIG. 8 provides a more specific example embodiment of a method for indicating whether a particular queue, i.e., queue V, is in a position to be shifted into a lower queue. The example of FIG. 8 is derived from an example embodiment of the stacked object queue arrangement illustrated in FIG. 4. Referring to both FIGS. 4 and 8, it is determined 290 whether queue V 158 is occupied, or more particularly, whether the valid bit(s) in the valid V register 170 indicate that queue V 158 is holding valid data. If so, it is determined 292 whether any of the lower queues W 150, X 152, Y 154, Z 156 in the stacked object queue arrangement are unoccupied (i.e., not designated as "valid" in corresponding valid registers 171, 172, 173, 174, 175). If any of the lower queues are not designated as valid, and shifting is enabled as determined at decision operation 294, a signal (e.g., LOAD_V_BOT) is set 296 to indicate that queue V 158 needs to be loaded into queue W 150. Otherwise, if any of the conditions 290, 292, 294 are not met, the signal is set 298 to indicate that queue V 158 is not to be loaded into queue W 150. The state of this signal, e.g., LOAD_V_BOT, is subsequently used to determine whether a queue location should actually shift. The flow diagram of FIG. 8 applies equally to indicating whether other queues are in a position to be shifted into a lower queue.

Figure 9:
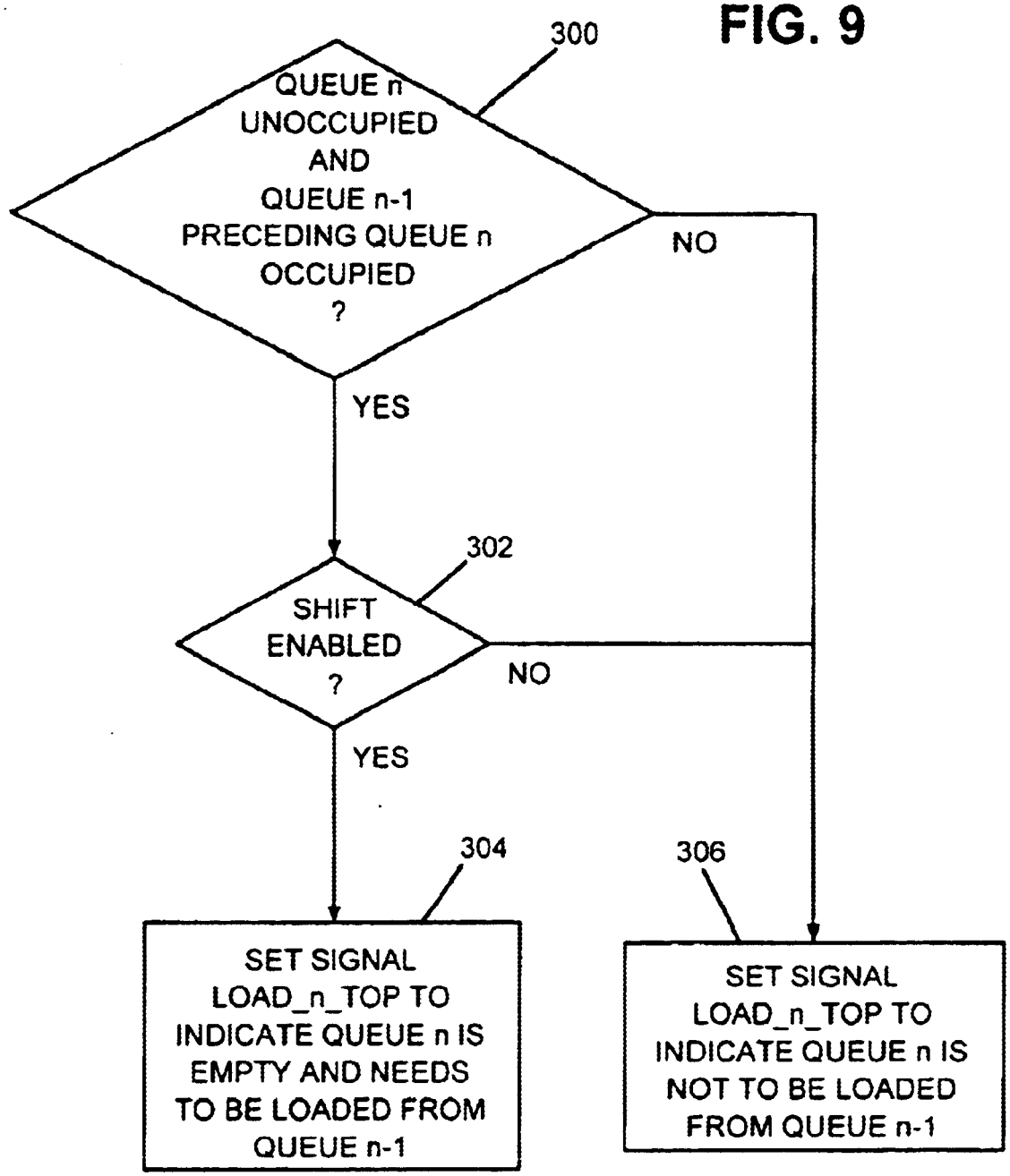
FIG. 9 is a flow diagram illustrating one embodiment of a method for indicating whether a queue is empty and needs to be loaded from the queue logically above it.

Referring now to FIG. 9, a flow diagram is provided to illustrate one embodiment of a method for indicating whether a queue is empty and needs to be loaded from the queue logically above it. Generally, a queue is in position to be loaded from the queue logically above it where the queue is designated as not valid, and the immediately preceding queue is designated as valid. More particularly, it is determined 300 whether the particular queue, queue n, is not occupied (i.e., not designed as "valid"), and whether the preceding queue n-1 is occupied (i.e., designed as "valid"). If both of these conditions are met, and shifting is enabled as determined at decision operation 302, a signal (e.g., LOAD_n_TOP) is set 304 to indicate that queue n is empty (i.e., not designated as valid) and needs to be loaded from queue n-1 (i.e., the queue logically above it in the stacked object queue arrangement). Otherwise, if any of the conditions 300, 302 are not met, the signal is set 306 to indicate that queue n is not to be loaded from queue n-1. The state of this signal, e.g., LOAD_n_TOP, is subsequently used to determine whether a queue location should actually shift. This is described more fully below.

Figure 10:
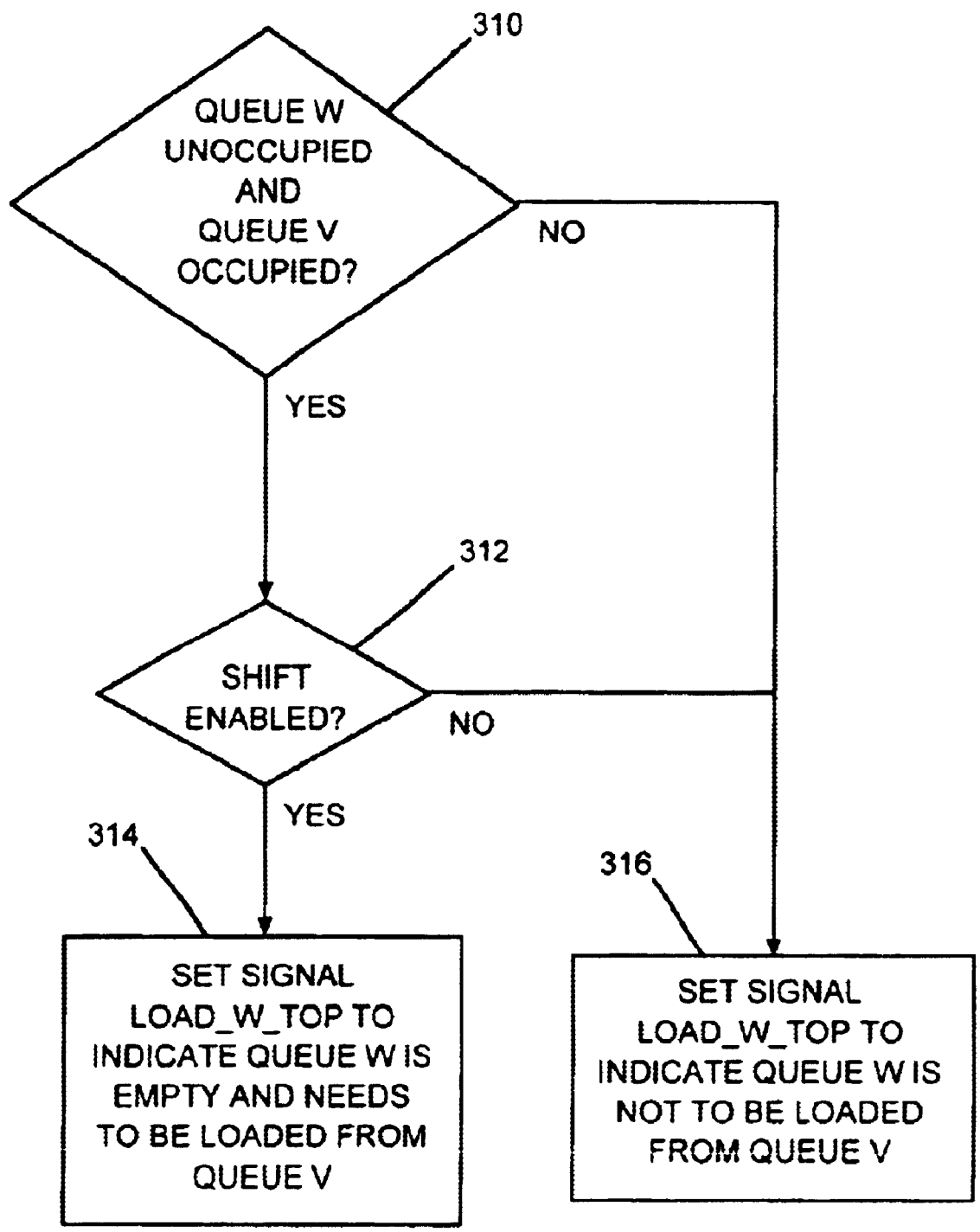
FIG. 10 provides a more specific example embodiment of a method for indicating whether a particular queue in the stacked queue arrangement is in a position to be loaded from a higher queue.

FIG. 10 provides a more specific example embodiment of a method for indicating whether a particular queue, i.e., queue W, is in a position to be loaded from a higher queue. The example of FIG. 10 is derived from an example embodiment of the stacked object queue arrangement illustrated in FIG. 4. Referring to both FIGS. 4 and 10, it is determined 310 whether queue W 150 is not occupied, or more particularly, whether-the valid bit(s) in the valid W register 171 indicate that queue W 150 is not holding valid data. It is also determined at decision operation 310 whether the preceding queue V 158 is occupied, or more particularly, whether the valid bit(s) in the valid V register 170 indicate that queue V 158 is holding valid data. If both of these conditions are met, and shifting is enabled as determined at decision operation 312, a signal (e.g., LOAD_W_TOP) is set 314 to indicate that queue W 150 is empty (i.e., not designated as valid at the valid W register 171) and needs to be loaded from queue V 158. Otherwise, if any of the conditions 310, 312 are not met, the signal is set 316 to indicate that queue W 150 is not to be loaded from queue V 158. The state of this signal, e.g., LOAD_W_TOP, is subsequently used to determine whether a queue location should actually shift. The flow diagram of FIG. 10 applies equally to indicating whether other queues are in a position to be loaded from a higher queue.

Figure 11:
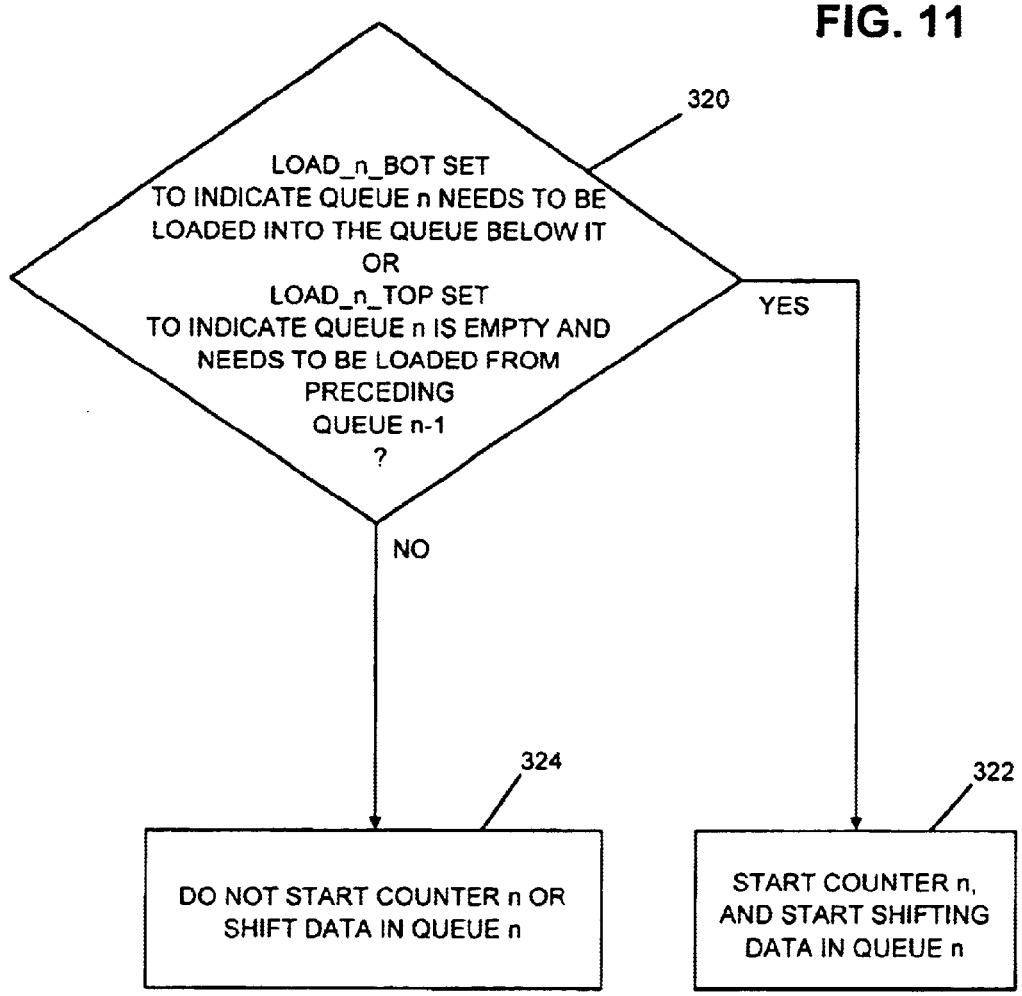
FIG. 11 is a flow diagram illustrating one embodiment of a method for indicating whether a queue location should shift.

Referring now to FIG. 11, a flow diagram is provided to illustrate one embodiment of a method for indicating whether a queue location should shift. Generally, if it is determined that a queue location should shift, a counter starts counting the number of shifts needed to shift the queue information from one queue to the next. To determine whether a queue location should shift, it is determined at decision operation 320 whether a signal, such as LOAD_n_BOT, has been set to indicate that queue n needs to be loaded into the queue below it, or whether a signal, such as LOAD_n_TOP, is set to indicate that queue n is empty and needs to be loaded from the preceding queue n-1. If either of these two conditions are met, a counter n is started, which starts shifting data in queue as illustrated at operation 322. In one embodiment, where one of these two conditions are met, a johnson counter is loaded with its initial value and starts counting. This starts the shift register queue for object n shifting. The last queue in the stacked object queue arrangement is an exception to the conditional rule, as it loads any time it is "invalid" and the queue above it is "valid." If neither of the two conditions are met as determined at decision operation 320, the counter n is not started, and no data is shifted in queue n as illustrated at block 324.

Figure 12:
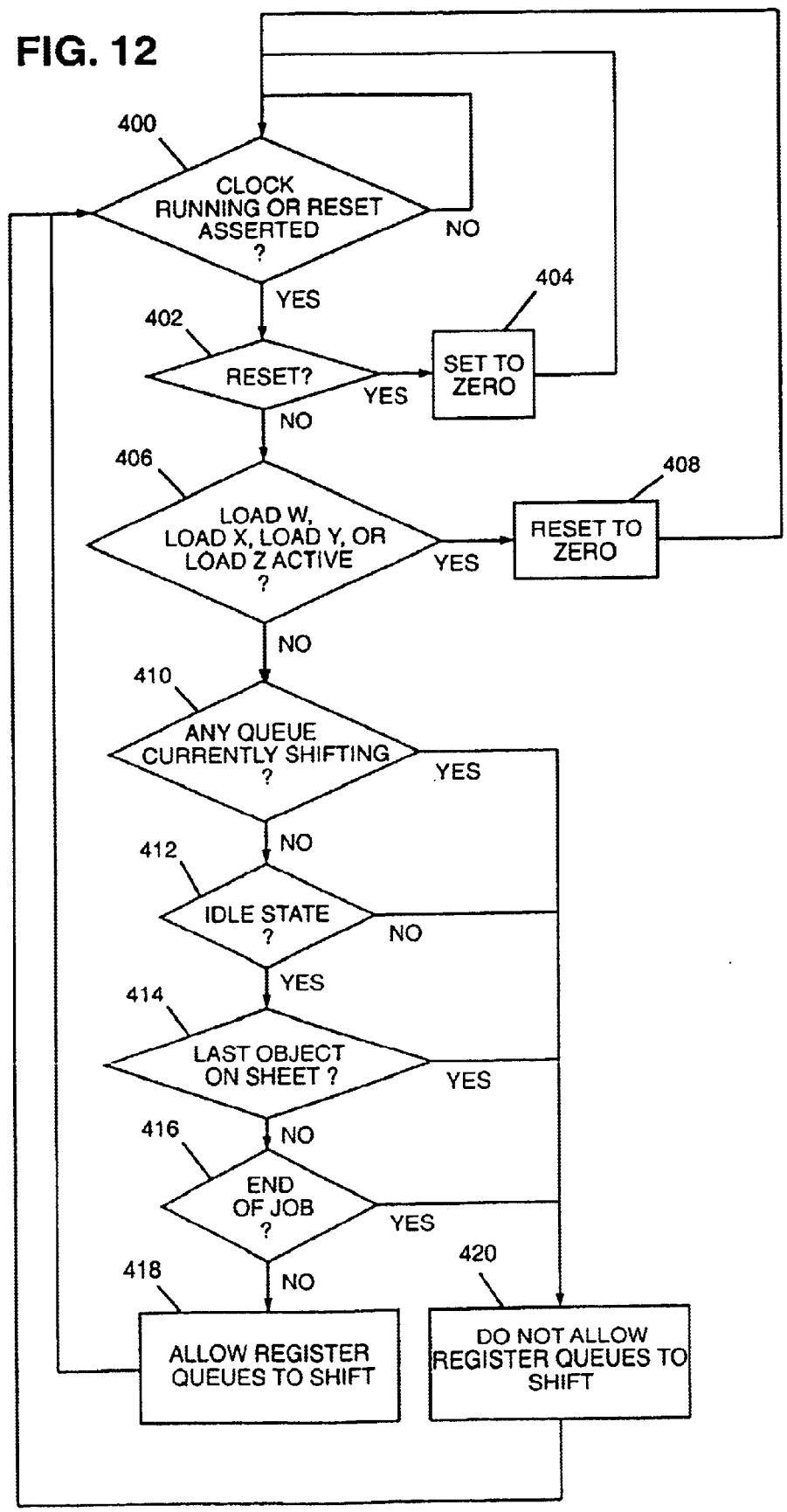
FIG. 12 is a flow diagram of one embodiment of a method for enabling the object queues to shift in accordance with the present invention.

FIG. 12 is a flow diagram of one embodiment of a method for enabling the object queues to shift in accordance with the present invention. Generally, the queues are allowed to shift if no queue is currently shifting, and main state machine is in the idle state, the last object on the sheet is not in the highest non-prefetch queue (i.e., queue W of FIG. 4), and the end of job is not in the highest non-prefetch queue (i.e., queue W of FIG. 4). More particularly, no activity will occur if the clock is not running or a reset signal has not been asserted, as determined at decision operation 400. Otherwise, on the occurrence of predetermined clock edges or assertion of a reset signal as determined at decision block 400, it is determined 402 whether a reset is active. If so, no queues will be shifted, as the queue shift indicator (e.g., ALLOW_QSHIFT) will be set to zero as seen at block 404. If no reset occurred, it is determined at decision operation 406 whether the LOAD signals are active, thereby indicating that a queue location should shift and causing a counter to start counting the number of shifts needed to shift the queue information from one queue to the next. This operation was described in connection with the flow diagram of FIG. 11. If any of the load signals are active, no queues will currently be shifted, and the queue shift indicator is reset 408 to zero.

If none of the load signals are active as determined at decision operation 406, it is determined at decision operation 410 whether any of the queues are currently shifting. In one embodiment, this determination occurs through various steps, including determining whether the n counter (i.e., the counter for a particular queue) is not zero. Where the counter value is not zero, this indicates that there is still a count in the counter n, and thus still data to shift in/out. An enable signal is manipulated for each of the queues depending on the state of its respective counter, and these enable signals can then be monitored to determine whether any of the queues are currently shifting. If any of the queues are currently shifting as determined at decision operation 410, the register queues are not allowed to shift, as seen at operation 420. If none of the queues are currently shifting, additional tests are performed to determine whether the queues will be allowed to shift. For example, for the queues to be allowed to shift, one embodiment of the invention requires that the main state machine be in an idle state as determined at decision operation 412. Further, the last object on the sheet must not be in the highest non-prefetch queue (i.e., queue W of FIG. 4), and the end of job must not be in the highest non-prefetch queue (i.e., queue W of FIG. 4). If these conditions are all met, the register queues are allowed to shift, as depicted at operation 418. Otherwise, the failure of one of the test conditions 410, 412, 414, 416 will disallow shifting of the queues as seen at operation 420. One embodiment of a process for implementing the illustrated operations of FIG. 12 is provided in Example #1 below.

Example #1

```
always @ (posedge CLK_16 or posedge RST)
if (RST)
   ALLOW_QSHIFT<=1'b0;
else
   if (LOAD_W||LOAD_X||LOAD_Y||LOAD_Z)
      ALLOW_QSHIFT<=1'b0; //Reset to zero
   else
      ALLOW_QSHIFT <=(~|{ENBL_-V,ENBL_W,
         ENBL_X,ENBL_Y,ENBL_Z})
         && IDLE-STATE
         && !LAST_OBJ_ON_SHEET
         && !END_OF_JOB;
```

Using the foregoing specification, the invention may be implemented as a machine, process, or article of manufacture by using standard programming and/or engineering techniques to produce programming software, firmware, hardware or any combination thereof.

Any resulting program(s), having computer-readable program code may be embodied within one or more computer-usable media such as memory devices or transmitting devices, thereby making a computer program product or article of manufacture according to the invention. As such, the terms "article of manufacture" and "computer program product" as used herein are intended to encompass a computer program existent (permanently, temporarily, or transitorily) on any computer-usable medium such as on any memory device or in any transmitting device. Such article of manufacture includes, but is not limited to, hard disks, floppy disks, CD-ROMs, tape, firmware components, and the like.

One skilled in the art of computer science will be able to combine the software created as described with appropriate general purpose or special purpose computer hardware to create a computer system and/or computer subcomponents embodying the invention, and to create a computer system and/or computer subcomponents for carrying out the method of the invention.

The foregoing description of the exemplary embodiment of the, invention has been presented for the purposes of illustration and description. It is not intended to be exhaustive or to limit the invention to the precise form dislosed. Many modifications and variations are possible in light of the above teaching. It is intended that the scope of the invention be limited not with this detailed description, but rather by the claims appended hereto.

What is claimed is:

1. A print object management apparatus for storing print object header information corresponding to a plurality of concurrently pending print objects, comprising:

a plurality of serially-coupled header queues, each configured to receive and store the print object header information associated with one of the concurrently pending print objects;

a validity storage module to store a plurality of validity indicators for each of the serially-coupled header queues, to indicate whether each respective serially-coupled header queues is storing valid print object header information; and a print control processor configured and arranged to serially shift the print-object header information to the serially-coupled header queues that are not associated with valid print object header information.

2. The print object management apparatus as in claim 1, further comprising means for determining whether print object header information in a particular one of the serially-coupled header queues is active on a particular scanline, to facilitate selection of a respective print object for transfer to a print head.

3. The print object management apparatus as in claim 1, wherein the validity storage module comprises a plurality of valid-data registers, one for each of the header queues to store the validity indicator for a respective one of the serially-coupled header queues.

4. The print object management apparatus as in claim 3, wherein the print control processor is further configured and arranged to serially shift the validity indicators through the valid-data registers as the print object header information is shifted through the serially-coupled header queues.

5. The print object management apparatus as in claim 4, further comprising a shift control module coupled to the validity storage module to coordinate a shift timing of the validity indicators such that the validity indicators are disregarded as the print object header information is shifted through the serially-coupled header queues.

6. The print object management apparatus as in claim 5, wherein the shift control module comprises a plurality of valid-shadow registers for temporarily storing a state of a respective one of the valid-data registers as the print object header information is shifted through the serially-coupled header queues.

7. The print object management apparatus as in claim 1, further comprising means for controlling shifting of the validity indicators as the print object header information is being shifted between the serially-coupled header queues.

8. The print object management apparatus as in claim 1, wherein the print control processor is further configured and arranged to concurrently print each of the concurrently pending print objects according to its respective print object header information stored in the serially-coupled header queues.

9. The print object management apparatus as in claim 1, wherein each of the serially-arranged header queues comprises one or more queue registers to respectively retain one or more print control parameters of the print object header information.

10. The print object management apparatus as in claim 9, wherein the queue registers are arranged in a serial register set in which the print control parameters are serially shifted as the print object header information is shifted.

11. The print object management apparatus as in claim 1, wherein at least one of the serially-coupled header queues is a prefetch queue to receive the print object header information for a subsequent print object, and wherein the print control processor is further configured and arranged to serially shift the print object header information from the prefetch queue to a serially-coupled header queue that is not associated with valid print object header information.

12. The print object management apparatus as in claim 11, a memory to store the print objects and the associated print object header information, wherein the, memory is coupled to the prefetch queue to supply the print objects and associated print object header information upon execution of a memory fetch operation.

13. The print object management apparatus as in claim 1, further comprising a prefetch queue to receive the print object header information for a subsequent print object, and wherein the print control processor is further configured and arranged to serially shift the print object header information from the prefetch queue to one of the serially-coupled header queues that is not associated with valid print object header information.

14. The print object management apparatus as in claim 1, further comprising a print page prioritization module coupled to the print control processor to associate a logical print page number to the print object header information in each of the serially-coupled header queues.

15. The print object management apparatus as in claim 14, wherein the print control processor is further configured and arranged to prioritize a print order of the print objects according to the logical print page number.

16. The print object management apparatus as in claim 14, wherein the print page prioritization module comprises a plurality of logical sheet registers, one for each of the serially-coupled header queues, to store the logical print page number for a respective one of the serially-coupled header queues.

17. The print object management apparatus as in claim 1, further comprising an input bus coupled to a designated one of the plurality of serially-coupled header queues to transmit the print object header information associated with each of the concurrently pending print objects to the designated serially-coupled header queue.

18. A method for managing print object header information associated with a plurality of print objects being processed for printing, the method comprising:
receiving print object headers at a designated print object queue of a plurality of stacked print object queues;
determining whether one or more remaining print object queues of the plurality of print object queues are currently occupied with valid print object header information; and
shifting the received print object headers through the stacked print object queues to the print object queues that are not occupied with valid print object header information, to facilitate receipt of additional print object headers at the designated print object queue.

19. The method of claim 18, further comprising processing each of the print objects according to its respective print object header information.

20. The method of claim 18, further comprising designating the print object queues associated with print objects currently being processed as occupied with valid print object header information.

21. The method of claim 20, further comprising designating the print object queues associated with print objects that have completed processing as unoccupied with valid print object header information.

22. The method of claim 18, further comprising designating the print object queues associated with print objects not currently being processed as unoccupied with valid print object header information.

23. The method of claim 18, further comprising prefetching a next available print object header, and providing the next available print object header to the designated print object queue upon availability of a print object queue that is not occupied with valid print object header information.

24. The method of claim 23, wherein prefetching a next available print object header comprises performing a memory fetch operation and storing the resulting print object header in a prefetch print object queue.

25. The method of claim 24, wherein the prefetch print object queue is the designated print object queue.

26. The method of claim 18, wherein determining whether one or more remaining print object queues of the plurality of print object queues are currently occupied with valid print object header information comprises monitoring valid data identifiers associated with each of the remaining print object queues, wherein the valid data identifiers indicate whether its respective print object queue is currently occupied with valid print object header information.

27. The method of claim 26, further comprising disallowing print processing functions based on the print object header information during shifting of the received print object headers through the stacked print object queues.

28. The method of claim 26, further comprising inactivating all of the valid data identifiers during shifting of the received print object headers through the stacked print object queues.

29. The method of claim 28, further comprising temporarily storing a pre-existing state of the valid data identifiers prior to inactivating all of the valid data identifiers.

30. The method of claim 29, further comprising shifting the temporarily stored states of the valid data identifiers to again be associated with their respective print object headers.

31. The method of claim 30, further comprising reactivating all of the valid data identifiers upon completion of the shifting of the received print object headers through the stacked print object queues.

32. The method of claim 18, further comprising associating a logical print page number to the print object header information in each of the stacked print object queues.

33. The method of claim 32, further comprising prioritizing a print order of the plurality of print objects being processed for printing according to the logical print page numbers.

34. A system for processing print objects, comprising:
a print processor for generating a plurality of print objects each having corresponding print object header information;
an interface adapter coupled to receive the print objects and corresponding print object header information from the print processor;
a memory coupled to the interface adapter to store the print objects and corresponding print object header information received via the interface adapter;
a print object manager for managing the print object header information associated with print objects concurrently processed for printing, the print object manager comprising:
(a) a plurality of header queues serially arranged, each configured to receive and store the print object header information associated with one of the concurrently processing print objects;

(b) a validity storage module to store a plurality of validity indicators for each of the header queues, to indicate whether each respective header queues is currently storing valid print object header information; and wherein the print processor is configured and arranged to serially shift the print object header information to the header queues associated with invalid print object header information.

35. The system of claim 34, further comprising a print engine to process the print objects in accordance with their respective print object header information.

36. The system of claim 34, further comprising a host computing system to generate print jobs that include the print objects and print object header information.

37. The system of claim 34, wherein the print object manager manages the print object header information associated with contone print objects generated by the print processor, and wherein a second print object manager concurrently manages the print object header information associated with line work print objects generated by the print processor.

38. A print object management apparatus for managing print object headers corresponding to a plurality of concurrently pending print objects; comprising:

means for receiving the print object headers at a designated one of a plurality of serially-coupled print object queues;

means for identifying the print object queues that are not occupied with valid print object headers; and means for shifting the received print object headers through the serially-coupled print object queues to those print object queues that are not occupied with valid print object headers, thereby facilitating receipt of additional print object headers at the designated print object queue.

39. The print object management apparatus as in claim 38, further comprising means for prefetching a next available print object header, and providing the next available print object header to the designated print object queue upon availability of a print object queue that is not occupied with valid print object header information.

40. The print object management apparatus as in claim 38, wherein the means for identifying the print object queues that are not occupied with valid print object headers comprises means for associating a valid-queue identifier with each of the print object queues, wherein each of the valid-queue identifiers indicates whether its respective print object queue is occupied with a valid print object header.

41. The print object management apparatus as in claim 38, further comprising means for associating a logical print page number to the print object headers in each of the print object queues.

42. The print object management apparatus as in claim 41, further comprising means for prioritizing a print order of the plurality of concurrently pending print objects according to the logical print page numbers.

43. A computer-readable medium having computer-executable instructions for performing steps comprising:

receiving print object headers at a designated print object queue of a plurality of stacked print object queues;

determining whether one or more remaining print object queues of the plurality of print object queues are currently occupied with valid print object header information;

shifting the received print object headers through the stacked print object queues to the print object queues that are not occupied with valid print object header information, to facilitate receipt of additional print object headers at the designated print object queue.

44. The computer-readable medium of claim 43 having further computer-executable instructions for prefetching a next available print object header, and for providing the next available print object header to the designated print object queue upon availability of a print object queue that is not occupied with valid print object header information.

45. The computer-readable medium of claim 44 wherein the computer-executable instructions for prefetching a next available print object header comprises performing a memory fetch operation and storing the resulting print object header in a prefetch print object queue.

46. The computer-readable medium of claim 43 wherein the computer-executable instructions for determining whether one or more remaining print object queues of the plurality of print object queues are currently occupied with valid print object header information comprises monitoring valid data identifiers associated with each of the remaining print object queues, wherein the valid data identifiers indicate whether its respective print object queue is currently occupied with valid print object header information.

47. The computer-readable medium of claim 46 having further computer-executable instructions for disallowing print processing functions based on the print object header information during shifting of the received print object headers through the stacked print object queues.

48. The computer-readable medium of claim 47 having further computer-executable instructions for inactivating all of the valid data identifiers during shifting of the received print object headers through the stacked print object queues.

49. The computer-readable medium of claim 48 having further computer-executable instructions for temporarily storing a pre-existing state of the valid data identifiers prior to inactivating all of the valid data identifiers.

50. The computer-readable medium of claim 49 having further computer-executable instructions for shifting the temporarily stored states of the valid data identifiers to again be associated with their respective print object headers.

51. The computer-readable medium of claim 50 having further computer-executable instructions for reactivating all of the valid data identifiers upon completion of the shifting of the received print object headers through the stacked print object queues.

52. The computer-readable medium of claim 43 having further computer-executable instructions for associating a logical print page number to the print object header information in each of the stacked print object queues.

53. The computer-readable medium of claim 52 having further computer-executable instructions for prioritizing a print order of the plurality of print objects being processed for printing according to the logical print page numbers.

\* \* \* \* \*

UNITED STATES PATENT AND TRADEMARK OFFICE
CERTIFICATE OF CORRECTION

PATENT NO. : 6,870,635 B1
DATED : March 22, 2005
INVENTOR(S) : Hoskins et al.

It is certified that error appears in the above-identified patent and that said Letters Patent is hereby corrected as shown below:

<u>Column 2,</u>
Line 43, "invention,a" should read -- invention, a --.

<u>Column 10,</u>
Lines 37-38, "A current or "active"logical sheet" should read -- A current or "active" logical sheet --.

<u>Column 19,</u>
Line 13, "wherein the, memory" should read -- wherein the memory --.

Signed and Sealed this

Ninth Day of August, 2005

JON W. DUDAS
*Director of the United States Patent and Trademark Office*